(12) United States Patent
Aoki et al.

(10) Patent No.: US 10,330,150 B2
(45) Date of Patent: Jun. 25, 2019

(54) ROLLING GUIDE DEVICE

(71) Applicant: THK CO., LTD., Tokyo (JP)

(72) Inventors: Shinji Aoki, Tokyo (JP); Hiroki Irikawa, Tokyo (JP); Shodai Aoyama, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 16/090,482

(22) PCT Filed: Mar. 16, 2017

(86) PCT No.: PCT/JP2017/010606
§ 371 (c)(1),
(2) Date: Oct. 1, 2018

(87) PCT Pub. No.: WO2017/179361
PCT Pub. Date: Oct. 19, 2017

(65) Prior Publication Data
US 2019/0107149 A1   Apr. 11, 2019

(30) Foreign Application Priority Data
Apr. 11, 2016 (JP) ................... 2016-078831

(51) Int. Cl.
*F16C 29/06* (2006.01)
*F16C 33/38* (2006.01)

(52) U.S. Cl.
CPC ...... F16C 29/0638 (2013.01); F16C 33/3825 (2013.01)

(58) Field of Classification Search
CPC .. F16C 29/06; F16C 29/0633; F16C 29/0635; F16C 29/0642; F16C 29/0645; F16C 33/38; F16C 33/3825
See application file for complete search history.

(56) References Cited

U.S. PATENT DOCUMENTS 6,155,718 A    12/2000  Takamatsu et al.
7,736,060 B2 *  6/2010  Matsumoto ......... F16C 29/0609
                                                      384/44

(Continued)

FOREIGN PATENT DOCUMENTS

DE  10 2006 047 945 A1    4/2008
JP       10-89359 A       4/1998

(Continued)

OTHER PUBLICATIONS

International Search Report dated Jun. 13, 2017, issued in counterpart International Application No. PCT/JP2017/010606 (2 pages).

*Primary Examiner* — Thomas R Hannon
(74) *Attorney, Agent, or Firm* — Westerman, Hattori, Daniels & Adrian, LLP

(57) ABSTRACT

Provided is a rolling guide device which is capable of preventing uneven wear of a holding belt by alleviating a tensile force that acts on the holding belt when the holding belt circulates in an endless circulation path together with rolling elements. The endless circulation path has a guide groove configured to guide movement of the holding belt in the endless circulation path. A condition of $t_{max}<\delta$ is satisfied, where: $t_{max}$ represents a maximum clearance between both end portions of the holding belt which are opposed to each other in the endless circulation path; $\delta$ is expressed by $$\delta = 2\int_0^{\frac{\pi}{2}} \sqrt{(a \sin \theta)^2 + (c \cos \theta)^2}\, d\theta - 2\int_0^{\frac{\pi}{2}} \sqrt{(c \sin \theta)^2 + (b \cos \theta)^2}\, d\theta;$$

2c represents an interval between the holding belt in a load path and the holding belt in a return path; A represents a depth to an arc top point of an outer peripheral surface of the guide groove in a direction change path; B represents a depth (Continued)

to an arc top point of an inner peripheral surface of the guide groove in the direction change path; "d" represents a thickness of the holding belt; and $a=(A-d/2)$ and $b=(B+d/2)$ are satisfied.

1 Claim, 5 Drawing Sheets

(56) References Cited

U.S. PATENT DOCUMENTS

| | | | |
|---|---|---|---|
| 8,408,796 B1* | 4/2013 | Hsu | F16C 33/3825 |
| | | | 384/45 |
| 2008/0085067 A1* | 4/2008 | Hsu | F16C 29/0609 |
| | | | 384/45 |
| 2009/0016653 A1* | 1/2009 | Chen | F16C 29/06 |
| | | | 384/44 |
| 2011/0058758 A1 | 3/2011 | Menges et al. | |
| 2018/0355915 A1* | 12/2018 | Aoki | F16C 29/0623 |

FOREIGN PATENT DOCUMENTS

| | | |
|---|---|---|
| JP | 11-294452 A | 10/1999 |
| JP | 3243415 B2 | 1/2002 |
| JP | 2006-125582 A | 5/2006 |

* cited by examiner

ROLLING GUIDE DEVICE

TECHNICAL FIELD

The present invention relates to a rolling guide device, which is configured to freely guide a work table of a machine tool or tables of various conveying devices along a track rail.

BACKGROUND ART

As a rolling guide device of this type, there has been known a rolling guide device disclosed in Patent Literature 1. This rolling guide device includes a track rail and a moving block. The track rail is laid on a fixed portion such as a bed. The moving block is freely movable along the track rail, and is capable of fixing a movable body such as a table being an object to be guided. The moving block is assembled to the track rail through intermediation of a plurality of rolling elements such as balls or rollers. A rolling surface for the rolling elements is formed on the track rail along a longitudinal direction of the track rail. The moving block has a rolling surface for the rolling elements, which is opposed to the rolling surface of the track rail. Further, the moving block has an endless circulation path for allowing the rolling elements to circulate from one end to another end of the rolling surface. Circulation of the rolling elements in the endless circulation path enables the moving block to freely move along the track rail.

Further, a holding belt which is configured to hold the rolling elements at constant intervals is incorporated into the endless circulation path together with the rolling elements. The holding belt is molded from a material having flexibility such as synthetic resin, and pockets configured to receive the rolling elements are arrayed at constant intervals in the holding belt. Further, the holding belt has a total length which is set smaller than a path length of the endless circulation path. When the holding belt is incorporated into the endless circulation path, both end portions of the holding belt are opposed to each other with an interval therebetween in the endless circulation path. The rolling elements roll on the rolling surface of the track rail and the rolling surface of the moving block while rotating in the pockets of the holding belt. As the balls circulate in the endless circulation path, the holding belt also circulates in the endless circulation path.

The endless circulation path for the rolling elements in the moving block includes a load path, a return path formed parallel to the load path, and a pair of direction change paths each connecting end portions of the load path and the return path to each other and having an arc shape. The load path is a region in which the rolling surface of the track rail and the rolling surface of the moving block are opposed to each other. The rolling elements roll in the load path while bearing a load between the track rail and the moving block. Meanwhile, the return path and the pair of direction change paths are no-load paths for returning the rolling elements from a termination end to a start end of the load path. In the no-load paths, the rolling elements do not bear any load.

Therefore, when a relative motion occurs between the track rail and the moving block, the rolling elements in the load path are forcibly caused to roll and proceed in the path. However, the rolling elements in the return path and the pair of direction change paths do not roll themselves, and are pulled or pushed by the rolling elements in the load path through intermediation of the holding belt to proceed in the return path and the pair of direction change paths.

CITATION LIST

Patent Literature

[PTL 1] JP 3243415 B2

DISCLOSURE OF THE INVENTION

Problems to be Solved by the Invention

As mentioned above, the holding belt is incorporated into the endless circulation path under the state in which the both end portions of the holding belt are opposed to each other. Thus, due to such movement of the rolling elements in the endless circulation path, a tensile force along a circulation direction repeatedly acts on the holding belt when the end portions of the holding belt enter or leave the load path. There is a fear in that such action may cause a part of the holding belt to strongly rub against belt guide grooves formed in the direction change paths, with the result that uneven wear is promoted. It has been a problem that arises particularly when the moving block is moved at high speed relative to the track rail.

Means for Solving the Problems

The present invention has been made in view of the above-mentioned problem, and has an object to provide a rolling guide device, which alleviates a tensile force acting on a holding belt when the holding belt circulates in an endless circulation path together with rolling elements, thereby being capable of preventing uneven wear of the holding belt.

Specifically, according to one embodiment of the present invention, there is provided a rolling guide device, including: a track rail; a large number of rolling elements configured to roll on the track rail; a moving block, which has an endless circulation path for the rolling elements, and is configured to freely move along the track rail; and a holding belt, which is flexible, has pockets configured to receive the rolling elements at predetermined intervals, is incorporated into the endless circulation path, and is configured to move in the endless circulation path together with the rolling elements. The endless circulation path includes: a load path for allowing the rolling elements to roll therein while bearing a load between the track rail and the moving block; a return path formed in parallel with the load path; and a pair of direction change paths each connecting the load path and the return path to each other.

The endless circulation path has a guide groove configured to guide movement of the holding belt in the endless circulation path. A condition of $t_{max} < \delta$ is satisfied, where: $t_{max}$ represents a maximum clearance between both end portions of the holding belt which are opposed to each other in the endless circulation path; $\delta$ is expressed by $$\delta = 2\int_0^{\frac{\pi}{2}} \sqrt{(a \sin \theta)^2 + (c \cos \theta)^2}\, d\theta - 2\int_0^{\frac{\pi}{2}} \sqrt{(c \sin \theta)^2 + (b \cos \theta)^2}\, d\theta;$$

2c represents an interval between the holding belt in the load path and the holding belt in the return path; A represents a depth to an arc top point of an outer peripheral surface of the guide groove in each of the pair of direction change paths; B represents a depth to an arc top point of an inner peripheral surface of the guide groove in each of the pair of direction change paths; "d" represents a thickness of the holding belt; and a=(A−d/2) and b=(B+d/2) are satisfied.

Effects of the Invention

According to the present invention, in a case in which the maximum clearance "t" between the both end portions of the holding belt which are opposed to each other in the endless circulation path is smaller than the amount δ defined by the expression described above, even when the holding belt in the no-load path is pulled due to rolling of the rolling elements in the load path, a leading end of the holding belt in a proceeding direction is brought into contact with a trailing end of the holding belt to press the trailing end before the holding belt strongly rubs against the guide groove in the direction change path. Thus, a tensile force which acts on the holding belt along with circulation of the holding belt is alleviated, thereby being capable of preventing uneven wear of the holding belt.

MODE FOR CARRYING OUT THE INVENTION

Now, detailed description is made of a rolling guide device according to one embodiment of the present invention with reference to the accompanying drawings.

Figure 1:
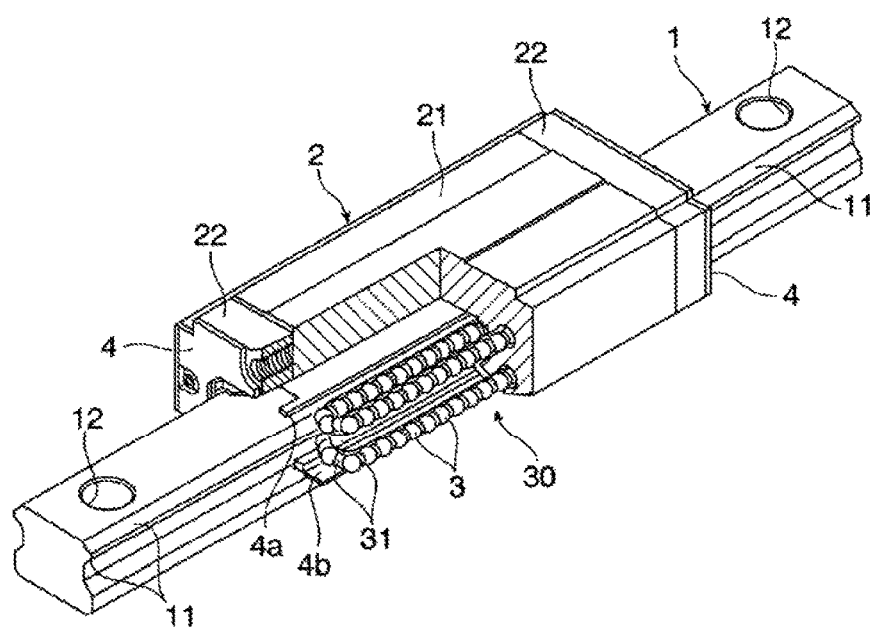
FIG. 1 is a perspective view for illustrating an example of embodiments of a roll ing guide device to which the present invention is applied.

FIG. 1 is a perspective view for illustrating an example of a rolling guide device to which the present invention is applicable. The rolling guide device includes a track rail 1 and a moving block 2. The track rail 1 extends linearly. The moving block 2 is assembled to the track rail 1 through intermediation of a large number of balls 3 being rolling elements. The track rail 1 is laid on a fixed portion, and a movable body of a type among various types is mounted to the moving block 2, thereby being capable of guiding the movable body along the track rail 1 in a freely reciprocable manner.

The track rail 1 is formed into an elongated body having a substantially rectangular cross section. The track rail 1 has a plurality of bolt mounting holes 12, which are formed at predetermined intervals in a longitudinal direction and each penetrate from an upper surface to a bottom surface. With use of fixing bolts inserted into the bolt mounting holes 12, the track rail 1 can be rigidly fixed to a fixed portion such as a bed or a column. On both right and left side surfaces of the track rail 1, there are formed protruding portions each extending along the longitudinal direction. On each of an upper portion and a lower portion of the protruding portion, there is formed one rolling surface 11 for balls. The track rail has four rolling surfaces 11 as a whole. The number of rolling surfaces 11 formed on the track rail 1 is not limited to four.

Meanwhile, the moving block 2 mainly includes a block main body 21 made of metal and a pair of end plates 22 made of synthetic resin. The pair of end plates 22 are mounted to both ends of the block main body 21 in a moving direction of the block main body 21. The moving block 2 has a plurality of endless circulation paths for the balls 3 so as to correspond to the rolling surfaces 11 of the track rail. The endless circulation paths are brought to completion by fixing the pair of end plates to the both ends of the moving block 2. A flexible holding belt 30 is incorporated into each endless circulation path, and a large number of balls 3 are arrayed in a single row in the holding belt 30. Thus, when the moving block 2 is moved in the longitudinal direction of the track rail 1, and the balls 3 roll on the rolling surfaces of the track rail 1, the holding belts 30 circulate in the endless circulation paths together with the balls 3.

Further, various seal members 4, 4a, and 4b, which are configured to seal gaps between the moving block and the track rail are fixed to the moving block, thereby preventing dust or the like adhering to the track rail 1 from entering the endless circulation paths. In the illustration of the moving block 2 in FIG. 1, one-fourth of the entirety of the moving block 2 is cut out so that the presence of the balls 3 and the holding belt 30 in the endless circulation path can be recognized.

Figure 2:
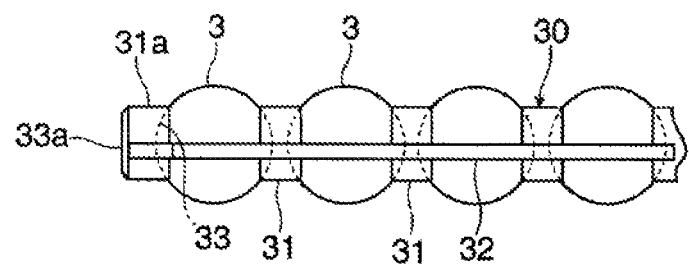
FIG. 2 is a side view for illustrating an example of a holding belt which is usable for the rolling guide device illustrated in FIG. 1.
Figure 3:
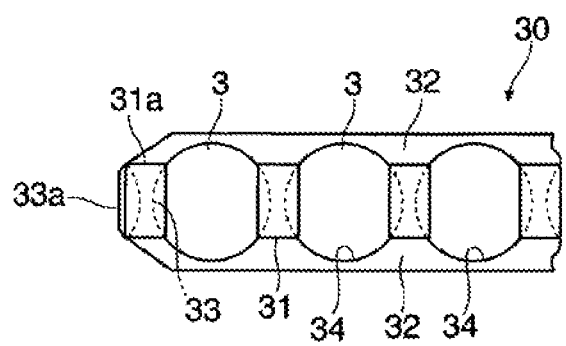
FIG. 3 is a plan view for illustrating the holding belt illustrated in FIG. 2.

FIG. 2 and FIG. 3 are illustrations of part of the holding belt 30 in which the balls 3 are arrayed, and include an end portion of the holding belt 30 in the longitudinal direction. The holding belt 30 includes a plurality of spacer portions 31 and a pair of coupling belt portions 32. The plurality of spacer portions 31 are arrayed in a single row at constant intervals. The pair of coupling belt portions 32 is configured to couple the spacer portions 31 to each other. The spacer portions 31 and the coupling belt portions 32 are manufactured by injection molding using synthetic resin. The holding belt 30 has flexibility as mentioned above. When the holding belt 30 circulates in the endless circulation path together with the balls 3, the holding belt 30 is repeatedly extended and curved. At this time, the flexibility is exerted mainly by the coupling belt portions 32, and the coupling belt portions 32 can be flexed more freely than the spacer portions 31.

Each spacer portion 31 has concave seats 33 each having a curvature approximate to that of a spherical surface of the ball 3, and a space between spacer portions which are adjacent to each other defines a pocket 34 for receiving the ball. Further, terminal end spacer portions 31a provided at end portions of the holding belt 30 each have the concave seat 33 only in a surface opposed to the ball 3, and a terminal end surface 33a is formed into a planar surface.

A diameter of each of the receiving pockets 34, which are formed in the holding belt 30 and configured to receive the balls 3, is set so as to be slightly larger than a diameter of each of the balls 3. With this, resistance which acts on the rotation of the ball about its axis in the receiving pocket is alleviated. However, a distance between spacer portions 31 which are adjacent to each other is set so as to be smaller than the diameter of each of the balls 3. Thus, the ball 3 received in the pocket 34 is prevented from dropping off from a space between the spacer portions 31 provided on both sides of the ball 3.

In the embodiment of the present invention described above with reference to FIG. 2 and FIG. 3, balls are used as rolling elements. However, the rolling elements may be rollers. In such a case, the concave seats 33 formed in the spacer portion 31 are concave seats each having a curvature approximate to that of an outer peripheral surface of the roller. Further, the concave seats 33 formed in the spacer portion 31 are not essentially required. In view of avoiding direct contact between the rolling elements, the spacer portions 31 may each be a spacer portion simply having a plate shape.

Figure 4:
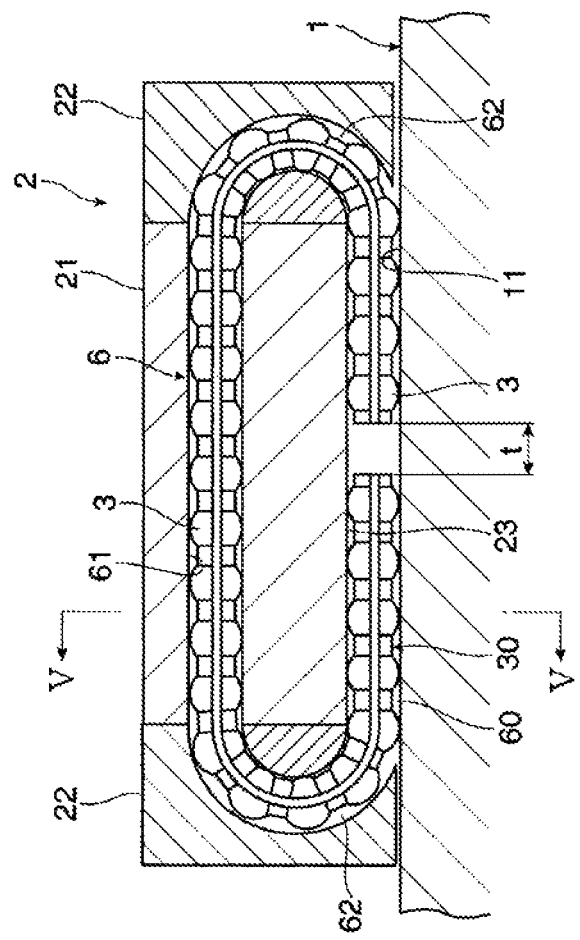
FIG. 4 is a sectional view for illustrating an endless circulation path formed in a moving block of the rolling guide device illustrated in FIG. 1.

FIG. 4 is a sectional view for illustrating the endless circulation path 6. The endless circulation path 6 includes a load path 60, a return path 61, and a pair of direction change paths 62. The block main body 21 forming the moving block 2 has a rolling surface 23 opposed to the rolling surface 11 of the track rail 1. The balls 3 roll while bearing a load between the rolling surface 11 of the track rail 1 and the rolling surface 23 of the block main body 21. In the endless circulation path 6, a path portion in which the balls 3 roll while bearing the load corresponds to the load path 60. Further, the block main body 21 has the return path 61 extending parallel to the load path 60. Typically, the return path 61 is formed so as to penetrate through the block main body 21, and an inner diameter of the return path 61 is set so as to be slightly larger than a diameter of the ball 3. Meanwhile, each of the pair of direction change paths 62 is a curved path having a substantially U-shape. The pair of direction change paths 62 is provided on both sides of the load path 60 in the longitudinal direction, and connects end portions of the load path 60 and end portions of the return path 61 to each other. The direction change paths 62 are formed in the end plates 22, respectively. When the pair of end plates 22 is fixed at predetermined positions at both ends of the block main body 21, the direction change paths 62 connect the load path 60 and the return path 61 to each other, thereby bringing the endless circulation path 6 capable of allowing circulation of the balls 3 to completion.

The holding belt 30 having the balls 3 received in the pockets 34 is incorporated into the endless circulation path 6. The both end portions of the holding belt 30 are opposed to each other inside the endless circulation path 6, and a circumferential clearance "t" is intentionally given between the both end portions. Further, although not shown in FIG. 4, a pair of guide grooves configured to receive a coupling belt portion 32 of the holding belt 30 is formed in the endless circulation path 6. The holding belt 30 moves in the endless circulation path 6 under a state in which the coupling belt portions 32 are inserted into the guide grooves, respectively. Those guide grooves are formed along a circumferential direction of the endless circulation path 6, and are formed in each of the load path 60, the return path 61, and the direction change paths 62. With this, twisting or meandering of the holding belt 30 in the endless circulation path 6 is prevented, thereby being capable of smoothly circulating the holding belt 30 in accordance with a motion of the moving block 2 relative to the track rail 1.

Figure 5:
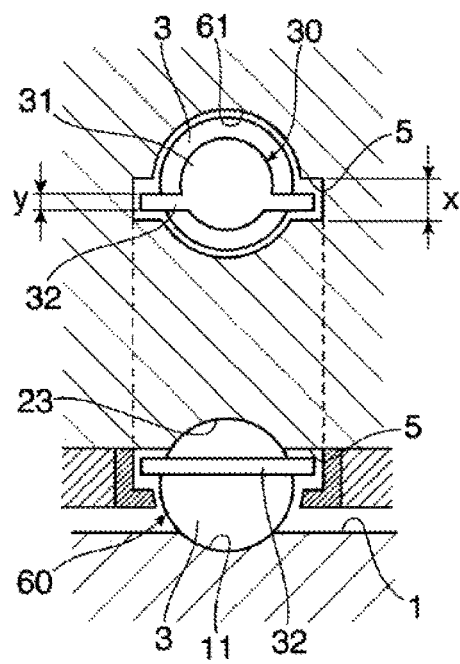
FIG. 5 is a sectional view taken along the line V-V of FIG. 4.

FIG. 5 is a schematic illustration of guide grooves 5 in the endless circulation path 6, and is an example of a cross section of the load path 60 and the return path 61 taken along a plane perpendicular to a longitudinal direction of the load path 60 and the return path 61. As illustrated in FIG. 5, both the load path 60 and the return path 61 have the guide grooves 5 configured to receive the coupling belt portions 32 of the holding belt 30. A width "x" of each guide groove 5 is set so as to be larger than a thickness "y" of the coupling belt portion 32, and a gap is defined between each guide groove 5 and the coupling belt portion 32. Although not shown in FIG. 5, also in the direction change paths 62, a gap is defined between each guide groove 5 and the coupling belt portion 32.

Therefore, the coupling belt portion 32 can be displaced in the guide groove 5 by the amount of the gap. The load path and the return path each have a linear shape, but the direction change paths each have a curved shape. Therefore, when a path of the coupling belt portion 32 in the direction change path 62 changes due to the presence of the gap, the above-mentioned circumferential clearance "t" of the holding belt 30 inside the endless circulation path 6 increases or decreases. Specifically, under a state in which the coupling belt portion 32 is in contact with an outer peripheral surface of the guide groove 5 in the direction change path 62, the circumferential clearance "t" of the holding belt 30 is maximum. Moreover, under a state in which the coupling belt portion 32 is in contact with an inner peripheral surface of the guide groove 5 in the direction change path 62, the circumferential clearance "t" of the holding belt 30 is minimum.

Figure 6:
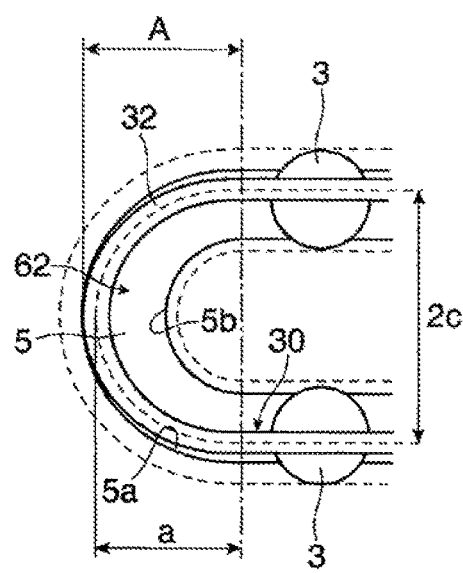
FIG. 6 is a schematic view for illustrating a state in which a coupling belt portion of the holding belt is in contact with an outer peripheral surface of a guide groove in a direction change path.
Figure 7:
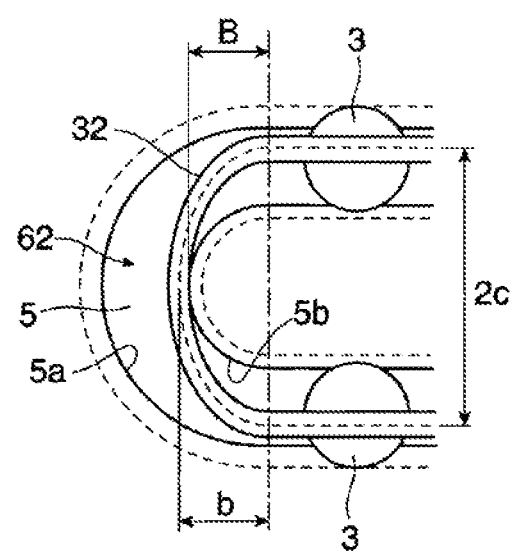
FIG. 7 is a schematic view for illustrating a state in which the coupling belt portion of the holding belt is in contact with an inner peripheral surface of the guide groove in the direction change path.

FIG. 6 and FIG. 7 are each a schematic view for illustrating a relationship between the guide groove 5 and the coupling belt portion 32 of the holding belt 30 in the direction change path 62. FIG. 6 is an illustration of a state in which the coupling belt portion 32 is in contact with the outer peripheral surface of the guide groove 5 in the direction change path 62. FIG. 7 is an illustration of a state in which the coupling belt portion 32 is in contact with the inner peripheral surface of the guide groove 5 in the direction change path 62. For convenience of description, in FIG. 6 and FIG. 7, the width of the guide groove 5 is illustrated with emphasis with respect to the thickness of the coupling belt portion 32 so that a state of the coupling belt portion 32 in the guide groove 5 can be easily understood.

As can be understood from FIG. 4, when the holding belt 30 circulates together with the balls 3 in the endless circulation path 6, the both end portions of the holding belt 30 move inside the endless circulation path 6 under a state in which the both end portions are opposed to each other. A propulsive force for the holding belt 30 in the endless circulation path 6 is generated by rolling of the balls 3 in the load path 60. Therefore, when the both end portions of the holding belt 30 are present in the load path 60 of the endless circulation path 6 as illustrated in FIG. 4, parts of the holding belt 30 which are present in the direction change paths 62 and the return path 61 are pulled from the front side by the leading end portion of the holding belt 30 in the circulation direction present in the load path 60, and are similarly pressed from the rear side by the trailing end portion of the holding belt 30 in the circulation direction present in the load path 60.

In a state before the state illustrated in FIG. 4 and immediately before the leading end portion of the holding belt 30 in the circulation direction enters the load path 60 of the endless circulation path 6, parts of the holding belt 30 which are present in the direction change paths 62 and the return path 61 move in the endless circulation path 6 by only a pressing force applied by the trailing end portion of the holding belt 30 in the circulation direction present in the load path 60 without being pulled by the leading end portion of the holding belt 30 in the circulation direction present in the load path 60. Thus, in this state, with focus on the behavior of the holding belt 30 in the direction change paths 62, as illustrated in FIG. 6, the coupling belt portion 32 of the holding belt 30 moves on the outermost path in the guide groove 5, and is in slide contact with an outer peripheral surface 5a of the guide groove 5.

In a state after the state illustrated in FIG. 4 and immediately after the trailing end portion of the holding belt 30 in the circulation direction exits from the load path 60 of the endless circulation path 6, parts of the holding belt 30 which are present in the direction change paths 62 and the return path 61 move in the endless circulation path 6 by only a tensile force applied by the leading end portion of the holding belt 30 in the circulation direction present in the load path 60 without being pushed by the trailing end portion of the holding belt 30 in the circulation direction present in the load path 60. Thus, in this state, with focus on the behavior of the holding belt 30 in the direction change paths 62, as illustrated in FIG. 7, the coupling belt portion 32 of the holding belt 30 moves on the innermost path in the guide groove 5, and is in slide contact with an inner peripheral surface 5b of the guide groove 5.

The inventors of the present application disassembled the moving block 2 whose traveling distance relative to the track rail 1 has reached a certain distance or more, and checked the state of wear of the coupling belt portion 32 of the holding belt 30. As a result, the inventors found uneven wear on an inner side of the coupling belt portion 32, that is, a side in contact with the inner peripheral surface 5b of the guide groove 5 in the direction change path 62. From this fact, through comparison of a state in which the coupling belt portion 32 of the holding belt 30 rubs against the outer peripheral surface 5a of the guide groove 5 in the direction change path 62 (state of FIG. 6) and a state in which the coupling belt portion 32 of the holding belt 30 rubs against the inner peripheral surface 5b (state of FIG. 7), it was found that the coupling belt portion 32 rubs more strongly against the guide groove 5 in the latter state, that is, in the state in which the holding belt 30 moves in the endless circulation path 6 by only the tensile force.

In order to suppress the occurrence of the uneven wear of the coupling belt portion 32, the inventors of the present application focused on the circumferential clearance "t" of the holding belt 30 inside the endless circulation path 6. As described above, the circumferential clearance "t" has a maximum value $t_{max}$ when the coupling belt portion 32 is in contact with the outer peripheral surface 5a of the guide groove 5, whereas the circumferential clearance "t" has a minimum value $t_{min}$ when the coupling belt portion 32 is in contact with the inner peripheral surface 5b. Thus, when the circumferential clearance "t" of the holding belt 30 is lost immediately before the coupling belt portion 32 is brought into contact with the inner peripheral surface 5b of the guide groove 5 in the direction change path 62, the top leading end of the holding belt 30 in the circulation direction is brought into contact with the top trailing end to press the top trailing end, thereby being capable of weakening the slide contact between the coupling belt portion 32 and the inner peripheral surface 5b of the guide groove 5.

When the leading end of the holding belt 30 enters the load path 60 of the endless circulation path 6, the holding belt 30 proceeds in the endless circulation path 6 by being pressed from the trailing end. A relationship between the guide groove 5 and the coupling belt portion 32 in both of the pair of direction change paths 62 corresponds to the relationship illustrated in FIG. 6, that is, the state in which the outer peripheral surface 5a of the guide groove 5 and the coupling belt portion 32 are in slide contact with each other. After that, the leading end and the trailing end of the holding belt 30 proceed in the load path 60. After the trailing end exits the load path 60, only the tensile force acts on the holding belt 30, and the relationship between the guide groove 5 and the coupling belt portion 32 in the direction change path 62 is changed from the relationship illustrated in FIG. 6 to the relationship illustrated in FIG. 7. However, the change from the state illustrated in FIG. 6 to the state illustrated in FIG. 7 does not occur simultaneously in both the pair of direction change paths 62. The change to the state illustrated in FIG. 7 occurs only in one direction change path. Then, the change to the state illustrated in FIG. 7 occurs in another direction change path.

Thus, in one direction change path 62, when the circumferential clearance of the holding belt 30 in the endless circulation path 6 having been $t_{max}$ is lost during the period from the state in which the coupling belt portion 32 of the holding belt 30 is in contact with the outer peripheral surface 5a of the guide groove 5 (FIG. 6) to the state in which the coupling belt portion 32 is in contact with the inner peripheral surface 5b (FIG. 7), the top leading end of the holding belt 30 in the circulation direction is brought into contact with the top trailing end to press the top trailing end, thereby being capable of weakening the slide contact between the coupling belt portion 32 and the inner peripheral surface 5b of the guide groove 5. That is, when the change in length of the coupling belt portion 32 in the guide groove 5 of the direction change path 62 is larger than the maximum value $t_{max}$ of the circumferential clearance of the holding belt 30 in the endless circulation path 6, the top leading end of the holding belt 30 presses the top trailing end before the coupling belt portion 32 rubs against the inner peripheral surface 5b of the guide groove 5.

It is assumed that the coupling belt portion 32 of the holding belt 30 takes an elliptical path in the guide groove 5 of the direction change path 62. With an interval 2c defined between the coupling belt portion 32 in the load path 30 and the coupling belt portion 32 in the return path 31, when the coupling belt portion 32 is in contact with the outer peripheral surface 5a of the guide groove 5 as illustrated in FIG. 6, it can be considered that the elliptical path of the coupling belt portion 32 forms an ellipse with a short axis "a" and a long axis "c". When the coupling belt portion 32 is in contact with the inner peripheral surface 5b of the guide groove 5 as illustrated in FIG. 7, it can be considered that the elliptical path of the coupling belt portion 32 forms an ellipse with a short axis b and the long axis "c".

In a case in which a depth to an arc top point of the outer peripheral surface 5a of the guide groove 5 in the direction change path 62 is represented by A, and a depth to an arc top point of the inner peripheral surface 5b of the guide groove 5 in the direction change path 62 is represented by B, when a thickness of the holding belt is represented by "d", the short axis "a" of the elliptical path given when the coupling belt portion 32 is in contact with the outer peripheral surface 5a of the guide groove 5 can be expressed by a=(A−d/2) and the short axis "b" given when the coupling belt portion 32 is in contact with the inner peripheral surface 5b of the guide groove 5 can be expressed by b=(B+d/2).

A reduction amount δ of the circumferential clearance "t" due to movement of the coupling belt portion 32 from the outer peripheral surface 5a to the inner peripheral surface 5b in the guide groove 5 can be considered as a difference in circumferential length between those ellipses, and is expressed by the following expression. A first term of this expression expresses a half circumferential length of the elliptical path given when the coupling belt portion 32 is in contact with the outer peripheral surface 5a of the guide groove 5, and a second term of this expression expresses a half circumferential length of the elliptical path given when the coupling belt portion 32 is in contact with the inner peripheral surface 5b of the guide groove 5.

$$\delta = 2\int_0^{\frac{\pi}{2}} \sqrt{(a\sin\theta)^2 + (c\cos\theta)^2}\, d\theta - 2\int_0^{\frac{\pi}{2}} \sqrt{(c\sin\theta)^2 + (b\cos\theta)^2}\, d\theta$$

Thus, as a result of comparison between the maximum value $t_{max}$ and the reduction amount $\delta$ of the circumferential clearance of the holding belt 30 in the endless circulation path 6, when a relationship of $t_{max} < \delta$ is satisfied, the top leading end of the holding belt 30 presses the top trailing end before the coupling belt portion 32 rubs against the inner peripheral surface 5b of the guide groove 5, and the holding belt moves in the endless circulation path not only by the tensile force applied from the leading end portion but also by the pressing force applied from the trailing end portion. With this, the slide contact between the coupling belt portion 32 and the inner peripheral surface 5b of the guide groove 5 is weakened, thereby being capable of preventing occurrence of the uneven wear of the holding belt 30.

The function which expresses the circumferential length of the ellipse is generally the elliptic integral as shown in the expression described above, and cannot be expressed by the elementary function. Therefore, a difference in circumferential length of the ellipse, that is, the reduction amount $\delta$ of the circumferential clearance "t" due to movement of the coupling belt portion 32 from the outer peripheral surface 5a to the inner peripheral surface 5b in the guide groove 5 is expressed through use of an approximate equation.

As the approximate equation therefor, the approximation equation of Takakazu Seki is used. When the long axis of the ellipse is represented by "m", and the short axis is represented by "n", a circumferential length L of the ellipse can be expressed as follows with the approximate equation of Takakazu Seki.

$$L = 2\sqrt{4(m-n)^2 + \pi^2 mn}$$

Thus, the reduction amount S of the circumferential clearance "t" due to the movement of the coupling belt portion 32 from the outer peripheral surface 5a to the inner peripheral surface 5b in the guide groove can be expressed by the following approximate equation.

$$\delta = \sqrt{4(a-c)^2 + \pi^2 ac} - \sqrt{4(c-b)^2 + \pi^2 cb}$$

As described above, according to the present invention, when the maximum value $t_{max}$ of the circumferential clearance of the holding belt 30 in the endless circulation path 6 is limited in relation to the behavior of the coupling belt portion 32 in the guide groove 5 of the direction change path 62, the circumferential clearance "t" of the holding belt 30 in the endless circulation path 6 is lost before the coupling belt portion 32 strongly rubs against the inner peripheral surface 5b of the direction change path 62, and the leading end of the holding belt 30 presses the trailing end. Thus, occurrence of the uneven wear of the holding belt 30 can be prevented while the coupling belt portion 32 of the holding belt 30 is prevented from strongly rubbing against the inner peripheral surface 5b of the guide groove 5. In particular, when the moving block 2 including the holding belt 30 is to be moved repeatedly at high speed relative to the track rail 1, such configuration contributes to securing durability of the holding belt.

The present invention is applicable not only to a rolling guide device including balls as rolling elements but also to a rolling guide device including rollers as rolling elements. Further, the rolling guide device described in detail with reference to FIG. 1 is merely an example, and the shape of the rolling guide device to which the present invention is applicable is not limited to that of the rolling guide device described above.

The invention claimed is:

1. A rolling guide device, comprising:
   a track rail;
   a large number of rolling elements configured to roll on the track rail;
   a moving block, which has an endless circulation path for the rolling elements, and is configured to freely move along the track rail; and
   a holding belt, which is flexible, has pockets configured to receive the rolling elements at predetermined intervals, is incorporated into the endless circulation path, and is configured to move in the endless circulation path together with the rolling elements,
   wherein the endless circulation path includes:
      a load path for allowing the rolling elements to roll therein while bearing a load between the track rail and the moving block;
      a return path formed in parallel with the load path; and
      a pair of direction change paths each connecting the load path and the return path to each other and having an arc shape,
   wherein the endless circulation path has a guide groove configured to guide movement of the holding belt in the endless circulation path, and
   wherein a condition of $t_{max} < \delta$ is satisfied, where:
   $t_{max}$ represents a maximum clearance between both end portions of the holding belt which are opposed to each other in the endless circulation path;
   $\delta$ is expressed by $$\delta = 2\int_0^{\frac{\pi}{2}} \sqrt{(a\sin\theta)^2 + (c\cos\theta)^2}\, d\theta - 2\int_0^{\frac{\pi}{2}} \sqrt{(c\sin\theta)^2 + (b\cos\theta)^2}\, d\theta;$$

2c represents an interval between the holding belt in the load path and the holding belt in the return path;
   A represents a depth to an arc top point of an outer peripheral surface of the guide groove in each of the pair of direction change paths;
   B represents a depth to an arc top point of an inner peripheral surface of the guide groove in each of the pair of direction change paths;
   "d" represents a thickness of the holding belt; and
   (a=A−d/2) and b=(B+d/2) are satisfied.

* * * * *